(12) United States Patent
Pawar et al.

(10) Patent No.: US 7,890,796 B2
(45) Date of Patent: Feb. 15, 2011

(54) AUTOMATIC MEDIA ERROR CORRECTION IN A FILE SERVER

(75) Inventors: Sitaram Pawar, Shrewsbury, MA (US);
Jean Pierre Bono, Westboro, MA (US);
Milena Bergant, North Grafton, MA (US); Ajay S. Potnis, Maharashtra (IN);
Ashwin B. Agrawal, Maharashtra (IN)

(73) Assignee: EMC Corporation, Hopkinton, MA (US)

( * ) Notice: Subject to any disclaimer, the term of this patent is extended or adjusted under 35 U.S.C. 154(b) by 1169 days.

(21) Appl. No.: 11/538,554

(22) Filed: Oct. 4, 2006

(65) Prior Publication Data
US 2008/0155316 A1 Jun. 26, 2008

(51) Int. Cl.
G06F 11/00 (2006.01)
(52) U.S. Cl. .................... 714/8; 714/5; 714/7
(58) Field of Classification Search ............. 714/8, 714/7, 5
See application file for complete search history.

(56) References Cited

U.S. PATENT DOCUMENTS

| | | | |
|---|---|---|---|
| 5,577,212 A * | 11/1996 | Russ ................... | 709/214 |
| 5,715,221 A * | 2/1998 | Ito et al. ................ | 369/47.14 |
| 5,850,559 A * | 12/1998 | Angelo et al. ........... | 713/320 |
| 5,893,140 A | 4/1999 | Vahalia et al. | |
| 6,088,778 A * | 7/2000 | Ruff et al. .............. | 711/173 |
| 6,324,581 B1 | 11/2001 | Xu et al. | |
| 6,389,420 B1 | 5/2002 | Vahalia et al. | |
| 6,477,629 B1 * | 11/2002 | Goshey et al. ........... | 711/162 |
| 6,571,259 B1 | 5/2003 | Zheng et al. | |
| 6,684,229 B1 * | 1/2004 | Luong et al. ............ | 707/204 |
| 6,957,362 B2 | 10/2005 | Armangau | |
| 2001/0034862 A1 * | 10/2001 | Ko et al. ............... | 714/710 |
| 2002/0019909 A1 * | 2/2002 | D'Errico ............... | 711/114 |
| 2003/0217119 A1 | 11/2003 | Raman et al. | |
| 2004/0128582 A1 * | 7/2004 | Chou ................... | 714/5 |
| 2004/0139128 A1 | 7/2004 | Becker et al. | |
| 2004/0267836 A1 | 12/2004 | Armangau et al. | |
| 2004/0268179 A1 * | 12/2004 | Stewart ................. | 714/8 |
| 2005/0015663 A1 | 1/2005 | Armangau et al. | |

(Continued)

OTHER PUBLICATIONS

Uresh Vahalia, UNIX Internals—The New Frontiers, 1996, pp. 261-289 and 338-371, Prentice-Hall, Inc., Upper Saddle River, NJ.

(Continued)

*Primary Examiner*—Scott T Baderman
*Assistant Examiner*—Chae Ko
(74) *Attorney, Agent, or Firm*—Richard Auchterlonie; Novak Druce & Quigg, LLP

(57) ABSTRACT

File systems possibly impacted by a bad sector in a disk drive are unmounted. Then the disk drive is scanned in order to identify additional bad sectors, and for each identified bad sector, a logical address of the bad sector is re-vectored to a good sector. An attempt is made to restore the data of each bad sector, and then the file system is checked for consistency. If a bad sector cannot be restored, any application relying on the bad sector is aborted. Once the file system is found to be consistent, the file system is remounted. Re-vectored blocks are reverse mapped to identify damaged or repaired directories and files. Damaged or repaired directories and files are reported to a system administrator, and damaged directories or files of a client are reported to the client.

8 Claims, 6 Drawing Sheets

U.S. PATENT DOCUMENTS

| | | | |
|---|---|---|---|
| 2005/0015672 A1* | 1/2005 | Yamada | 714/38 |
| 2005/0216788 A1* | 9/2005 | Mani-Meitav et al. | 714/6 |
| 2005/0240628 A1 | 10/2005 | Jiang et al. | |
| 2005/0283655 A1* | 12/2005 | Ashmore | 714/7 |
| 2006/0004879 A1* | 1/2006 | Tone | 707/200 |
| 2006/0101401 A1* | 5/2006 | Brumme et al. | 717/124 |
| 2006/0107091 A1* | 5/2006 | Hafner et al. | 714/5 |
| 2006/0107103 A1* | 5/2006 | Rodrigues et al. | 714/7 |
| 2006/0294161 A1* | 12/2006 | Augenstein et al. | 707/204 |
| 2007/0159897 A1* | 7/2007 | Wang | 365/200 |

OTHER PUBLICATIONS

Enginuity: The Symmetric Storage Operating Environment, Jul. 2005, 21 pages, EMC Corporation, Hopkinton, MA.

Introducing RAID 5 on Symmetric DMX, Jan. 19, 2004, 12 pages, EMC Corporation, Hopkinton, MA.

EMC Double Checksum for Oracle, Jan. 1, 2004, 11 pages, EMC Corporation, Hopkinton, MA.

EMC Symmetrix DMX Architecture, Mar. 2004, 76 pages, EMC Corporation, Hopkinton, MA.

Oracle 10g and EMC CLARiiON with ATA, Oct. 2003, 4 pages, EMC Corporation, Hopkinton, MA.

Validating EMC TimeFinder/Mirror with Oracle8I, Oracle9I, and Oracle 10g, Sep. 2005, 18 pages, EMC Corporation, Hopkinton, MA.

Celerra File Server Architecture for High Availability, Aug. 1999, 11 pages, EMC Corporation, Hopkinton, MA.

David A. Patterson, et al., Introduction to Redundant Arrays of Inexpensive Disks (RAID), Spring CompCon 89, Feb. 27-Mar. 3, 1989, pp. 112-117, IEEE Computer Society, IEEE, New York, NY.

* cited by examiner

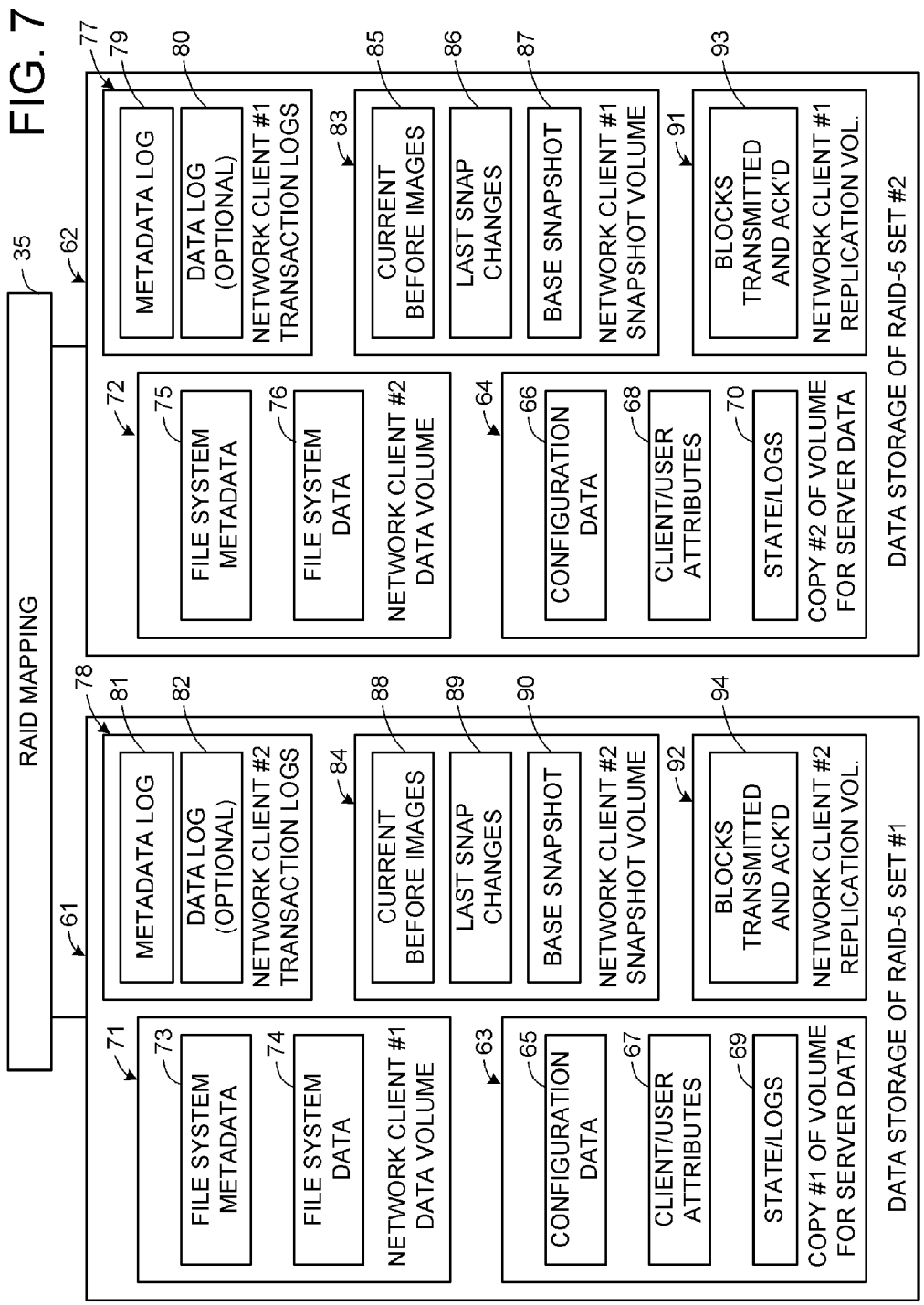

AUTOMATIC MEDIA ERROR CORRECTION IN A FILE SERVER

FIELD OF THE INVENTION

The present invention relates generally to file servers, and more particularly to recovery from a loss of data from storage due to a media error.

BACKGROUND OF THE INVENTION

Various techniques have been used for failure containment and recovery in a file server. These techniques include error handling routines, background diagnostic routines, background error scrubbing routines, redundant disk storage, redundant processors, redundant memory, redundant data paths, and redundant power supplies.

During periods of reduced activity, background diagnostic routines load memory and disk with test data and confirm that each is operating correctly. The background diagnostic routines also build a baseline of information that is used for tracking trends, and predicting and preventing failures.

During periods of reduced activity, background error scrubbing routines periodically read and re-write all areas of memory and storage in order to detect potential errors. Any small or "soft" error is detected and corrected. If a large or "hard" error is detected, the defective area of memory or storage is "fenced off" by re-mapping of the erroneous memory segment or sector. If the problem is significant for a particular memory board or disk drive, then the memory board or disk drive is taken out of service, and all usable data is copied from the memory board or disk drive to a "hot spare."

A preferred arrangement of redundant disk storage is known as RAID-5. RAID-5 is described in Patterson et al., "A case for redundant arrays of inexpensive disks (RAID)," ACM SIGMOD International Conference on Management of Data, Chicago, Ill., 1-3 Jun. 1988, pages 109-116. In practice, a RAID-5 set of disk drives typically includes either four or eight disk drives. The storage of each disk drive is called a "physical disk." Each disk drive contains data tracks and parity tracks. Each parity track in a disk drive contains parity computed by the exclusive-OR (XOR) of data tracks striped across the other disk drives in the RAID set, including a respective data track in each of the other disk drives. If a single disk drive in the RAID-5 set fails, then the RAID-5 set can operate with the surviving members. Each track on the failed disk drive is reconstructed from data or parity in the other disk drives of the RAID-5 set by exclusive-OR'ing the other tracks in the same stripe.

It is unlikely but possible for a RAID-5 set to return a bad sector media error in response to a request to read or write to a specified disk sector. Such an error indicates a loss of at least a sector of data because errors have occurred not only in the specified disk sector but also in at least one other sector in the same stripe across the RAID-5 set. Therefore the requested data cannot be read from the specified sector or reconstructed from sectors in the other disk drives of the RAID-5 set.

Typically, a bad sector media error is returned to the requesting application, and also reported to a system administrator. Since the error indicates a disk drive failure, the application should not continue to access the disk drive, and may be prevented from doing so by continuing to receive the bad sector media error in response to any repeated request for access. The system administrator will attempt to find a backup copy of the LUN, file system, or dataset being accessed by the application, and if a backup copy is found, the system administrator will restore the backup copy into replacement storage. The application will then be restarted manually upon the restored backup copy in the replacement storage. If the application has been maintaining a transaction log of changes since creation of the backup copy, then it will be possible to re-play the transaction log in order to restore the backup copy to the state existing at the time of the media error. In this fashion, it may be possible for the application to fully recover from the media error.

SUMMARY OF THE INVENTION

It is desired to provide automatic recovery from a bad sector media error from a disk array. It is also desired to avoid or reduce the recovery time associated with a complete file system restore. It is further desired to notify the system administrator of particular file systems, files, or directories that are impacted by the bad sector media error.

In accordance with one aspect, the invention provides a method of responding to a bad sector media error of a disk drive in a file server. The disk drive has sectors storing logical blocks of a file system. In response to the bad sector media error, the file system is unmounted. Then the sectors of the disk drive are scanned in order to identify bad sectors, and for each identified bad sector, a logical address of the bad sector is re-vectored to a good sector. Then the file system is checked for consistency. Once the file system is found to be consistent, the file system is remounted.

In accordance with another aspect, the invention provides a method of responding to a bad sector media error of a disk drive in a file server. The method includes reverse-mapping a logical block address of the bad sector affected by media error to identify a damaged file containing a logical block of the bad sector, and reporting to a client of the file server that the identified file is damaged.

In accordance with another aspect, the invention provides a file server including a disk storage array and at least one data processor coupled to the disk storage array for accessing a file system in the disk storage array in response to file access requests from clients of the file server. At least one data processor is programmed for responding to a bad sector media error of a disk drive in the disk storage array by: (a) unmounting the file system; and then (b) scanning sectors of the disk drive in order to identify bad sectors, and for each identified bad sector, re-vectoring a logical address of the bad sector to a good sector; and then (c) checking the file system for consistency, and (d) once the file system is found to be consistent, remounting the file system.

BRIEF DESCRIPTION OF THE DRAWINGS

Additional features and advantages of the invention will be described below with reference to the drawings, in which:

FIG. 7 shows an arrangement of data structures in storage of two separate RAID-5 sets of disk drives to facilitate automatic restoration in the event that data is lost from one of the RAID-5 sets.

Figure 1:
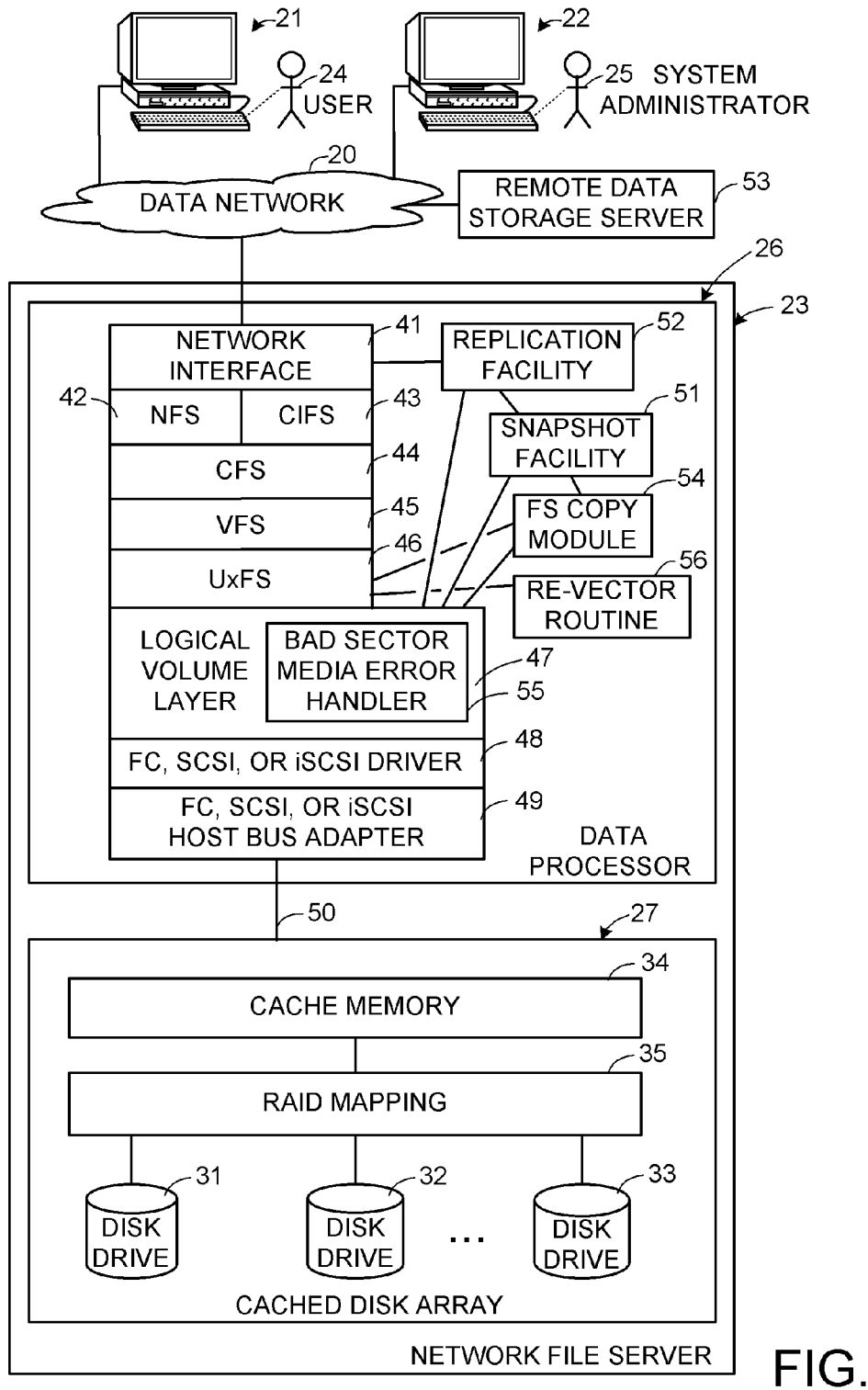
FIG. 1 is block diagram of a data network including a network file server using the present invention.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention. The data processing system includes a data network 20 interconnecting clients 21, 22 and servers such as a network file server 23 and a remote data storage server 53. The data network 20 may include any one or more of network connection technologies, such as Ethernet, and communication protocols, such as TCP/IP. The clients 21, 22, for example, are workstations such as personal computers using either UNIX or Microsoft Windows operating systems. The workstations are operated by human users 24, 25. The user 25 is a system administrator having sufficient privileges for configuring the network file server 23 and for receiving status and error messages from the network file server.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, and Jiang et al., U.S. Patent Application Publication 2005/0240628, published Oct. 27, 2005, incorporated herein by reference.

The network file server 23 includes at least one data processor 26 and a cached disk array 27. The network file server 23 is managed as a dedicated network appliance, integrated with popular network file systems in a way, which, other than its superior performance, is transparent to the end user. The data processor 26, for example, is a high-end commodity computer. The cached disk array 27 includes multiple disk drives 31, 32, 33, a high-speed random-access cache memory 34, and RAID mapping 35 between the cache memory 34 and the disk drives.

Figure 5:
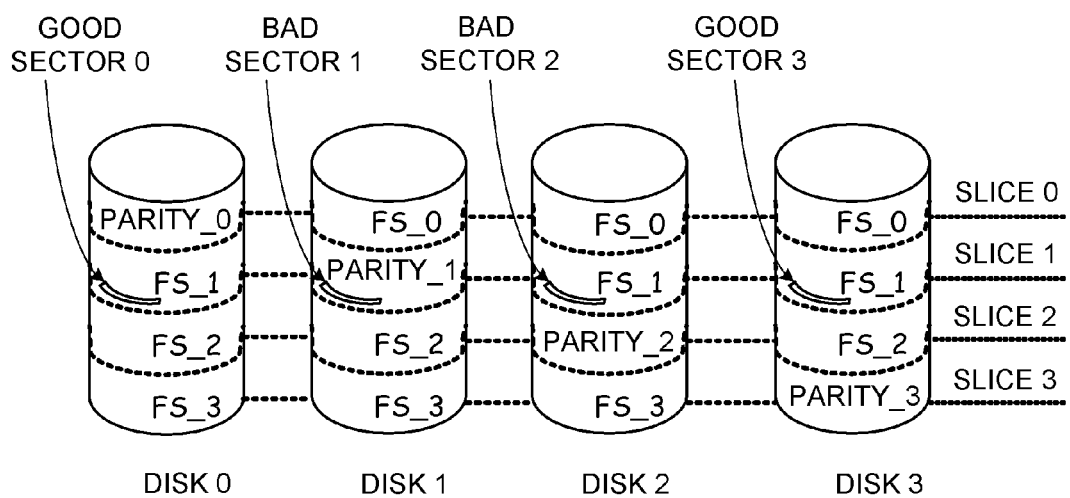
FIG. 5 shows a particular arrangement of data and parity stored in a RAID-5 set of disk drives.

The disk drives 31, 32, 33, for example, are organized into RAID-5 sets, each containing either four or eight disk drives. The RAID mapping 35 maps logical block of data to respective data sectors of the disk drives 31, 32, 33, for example, as shown in FIG. 5. The RAID mapping 35 also maintains parity sectors of the disk drives 31, 32, 33, and automatically recovers from single sector errors or single disk drive errors in each RAID-5 set by reconstructing the content of the failed sector or disk drive from sectors of the other disk drives in the RAID-5 set.

The data processor 26 has a network interface 41 for communication of data packets over the data network 20 via a data transmission protocol such as TCP/IP. The data processor 26 is programmed with a Network File System (NFS) module 42 for supporting communication with network clients over the data network 20 using the NFS file access protocol, and a Common Internet File System (CIFS) module 43 for supporting communication with network clients over the data network using the CIFS file access protocol. The NFS module 42 and the CIFS module 43 are layered over a Common File System (CFS) module 44, and the CFS module is layered over a Virtual File System (VFS) module 45. The VFS module 45 is layered over a Universal File System (UxFS) module 46. The UxFS module 46 supports a UNIX-based file system, and the CFS module 44 provides higher-level functions common to NFS and CIFS.

The UxFS module 46 accesses data organized into logical volumes defined by a logical volume layer module 47. Each logical volume maps to contiguous or striped logical storage addresses in the cached disk array 27. The logical volume layer module 47 is layered over a Fibre-Channel (FC), Small Computer System Interface (SCSI), or an Internet SCSI (iSCSI) driver 48. The data processor 26 sends storage access requests through a host bus adapter 49 using the FC, SCSI, or iSCSI protocol, depending on the physical data link 50 between the data processor 26 and the cached disk array 27.

As shown in FIG. 1, the data processor 26 is further programmed with a snapshot facility 51 and a replication facility 52. The snapshot facility 51 performs a snapshot copy process, for example, by a copy-on-first-write to each block in a production volume, in order to save an old version ("before image") of the changed block in a snapshot volume. The replication facility 52, for example, replicates, to the remote data storage server 53, changes between a most recent snapshot copy and the next-most-recent snapshot copy of the production volume. Details regarding such a snapshot facility 50 and a replication facility 51 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30. 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

As further shown in FIG. 1, the data processor 26 is programmed with a file system (FS) copy module 54 for copying data from a specified source file system to a specified destination file system. The FS copy module 54 can be invoked by internal applications such as the replication facility 52 or the snapshot facility 51, or by external applications of the clients 21 and 22. For example, the snapshot facility 51 or the replication facility 52 may use the FS copy module 54 to establish an initial version to which subsequent changes are copied or replicated. The FS copy module 54 is also used for restoring data lost from a RAID set by copying data to the RAID set from a backup copy, as further described below.

It is unlikely but possible for a RAID-5 set of the disk drives 31, 32, 33 to return a bad sector media error in response to a request to read or write to a specified disk sector. Such an error indicates that data has been lost from the cached disk array 27. The error is indicated by an error code returned to the logical volume layer 47. Upon receiving such an error code, the logical volume layer invokes a bad sector media error handler 55. This error handler 55 causes the UxFS module 46 to invoke a re-vector routine 56 to automatically re-vector the bad sector to a good sector. The error handler 55 also reports damaged data storage objects such as files or file systems, and contains the damage to the bad sector by restoring the damaged objects if possible or aborting and restarting applications that rely upon the damaged objects. The ability and ease of containing the damage to the bad sector depends on the particular objects that are damaged and the presence or absence of redundant data stored in the network file server 23 or replicated to the remote data storage server 53.

Figure 2:
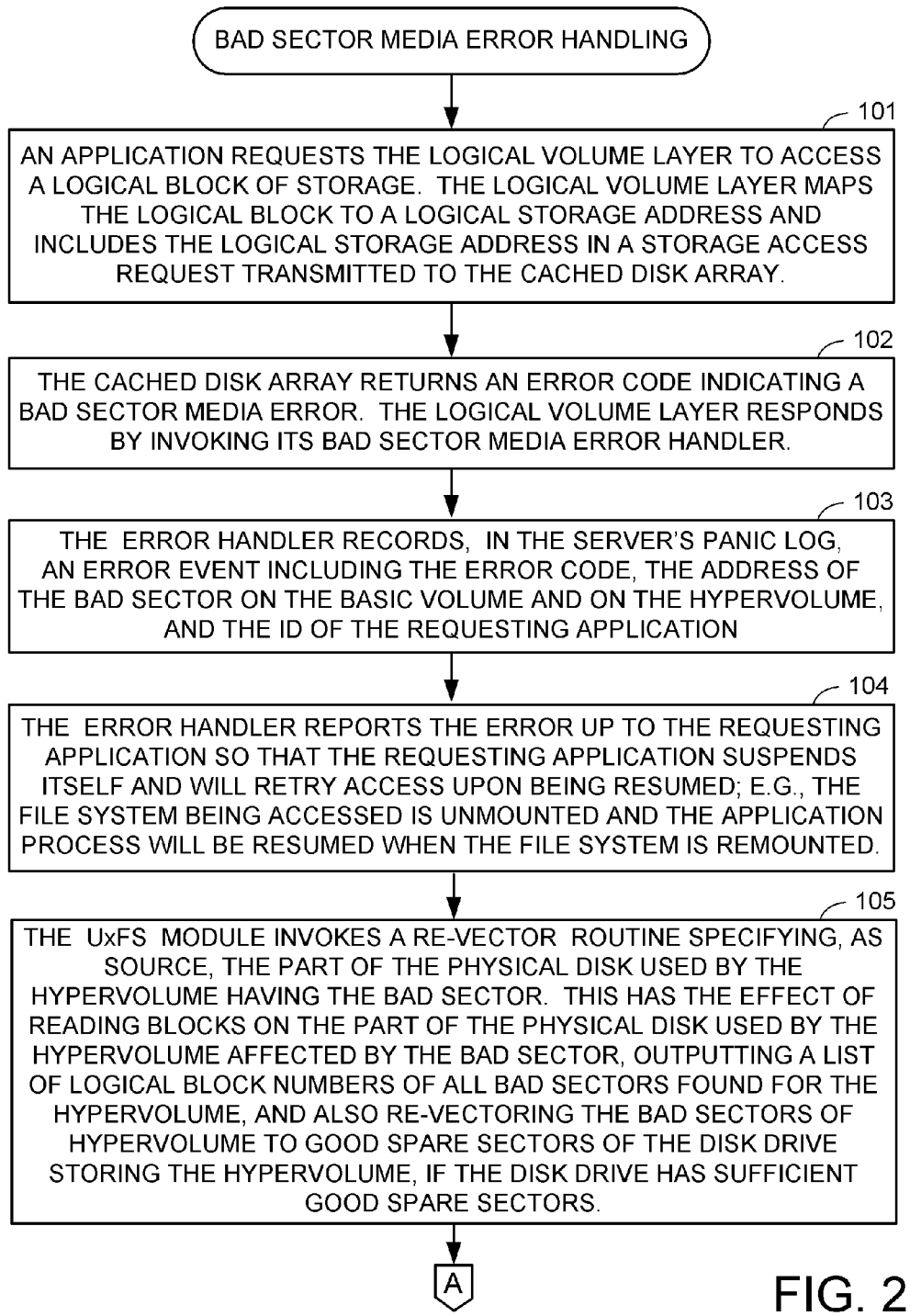
FIGS. 2, 3, and 4 together comprise a flowchart of a procedure for handling a bad sector media error in accordance with the present invention.
Figure 3:
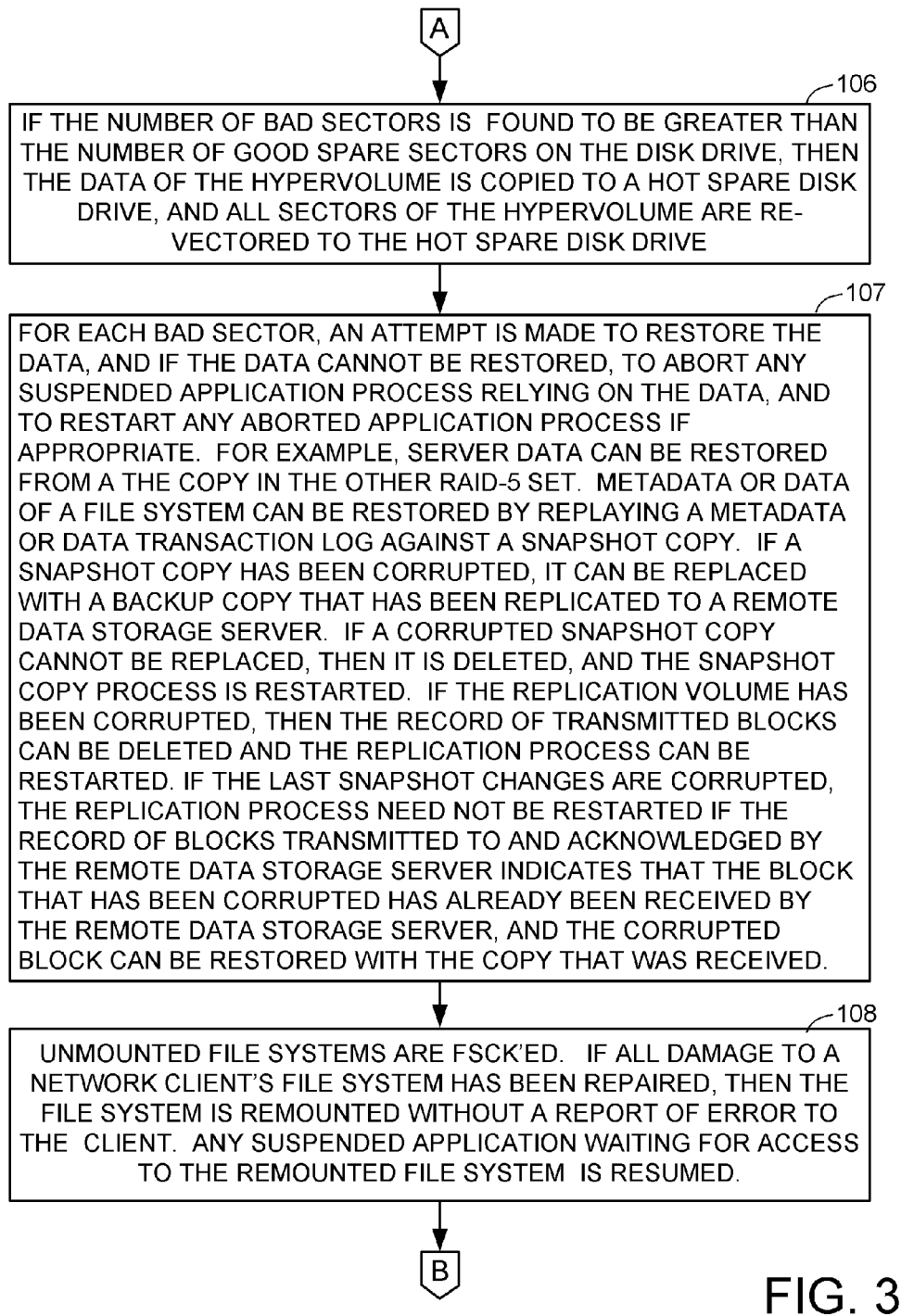
Figure 4:
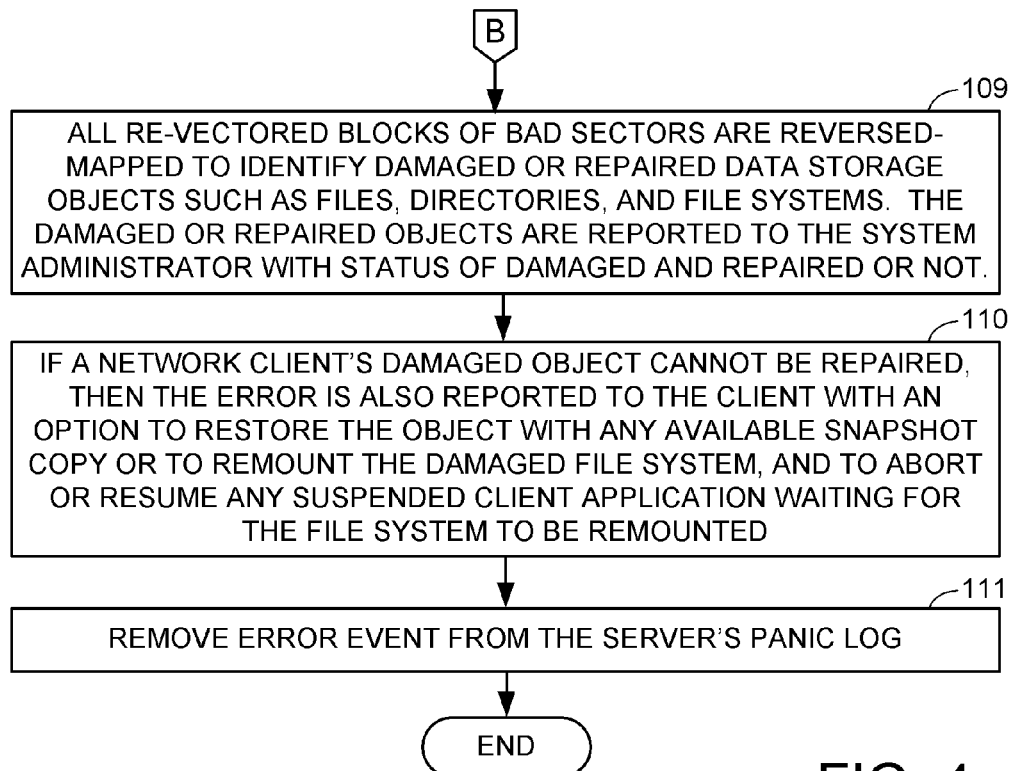

FIGS. 2, 3, and 4 together show a way of programming the bad sector media error handler (55 in FIG. 1). In a first step 101, an application such as the UxFS file system, the snapshot facility, or the replication facility requests the logical volume layer to access a logical block of storage. The logical volume layer maps the logical block to a logical storage address, and includes the logical storage address in a storage access request transmitted to the cached disk array. In step 102, the cached disk array returns an error code indicating a bad sector media error. The logical volume layer responds by invoking its bad sector media error handler. In step 103, the error handler records, in the server's panic log, an error event including the error code, the address of the bad sector on the basic volume and on the hyper volume, and the process ID of the requesting application. In step 104, the error handler reports the error up to the requesting application so that the requesting application suspends itself and will retry access upon being resumed. For example, the file system being accessed is unmounted and the application process will be resumed when the file system is remounted. During the process of unmounting of the file system, any and all pending I/O operations should be allowed to complete gracefully.

In step 105, the UxFS file system invokes a re-vector routine specifying, as source, part of the physical disk used by the hypervolume having the bad sector. This has the effect of reading and writing all blocks of the hypervolume, outputting a list of logical block numbers of all bad sectors found for the hypervolume, and re-vectoring the bad sectors of the hypervolume to good spare sectors of the disk drive storing the hypervolume, if the disk drive has sufficient good spare sectors. Prior to re-vectoring a bad sector, any file system that includes the bad sector should be unmounted, because once the logical block of the sector is re-vectored to a good sector, the logical block may be read without return of a media error. As a matter of convenience, possibly at the expense of some additional disruption to client access and some additional processing, each and every file system configured on a RAID-5 set could be unmounted prior to the beginning of step 105 in response to a bad sector media error from the RAID-5 set, and all of the hypervolumes of the RAID-5 set could be scanned concurrently in step 105.

In step 106 of FIG. 3, if the number of bad sectors is found to be greater than the number of good spare sectors on the disk drive, then the entire disk drive is considered to be defective. For removal of the disk drive from the cached disk array, the hypervolume is copied to a hot spare disk drive, and all sectors of the hypervolume are re-vectored to the hot spare disk drive. For example, copying to the hot spare disk drive and re-vectoring to the host spare drive could be done by the RAID mapping layer of the cached disk array. In the procedure of FIGS. 2, 3, and 4, the re-vector routine invoked in step 105 could be coordinated with the fail-over to the hot spare disk drive so that the re-vector begun in step 105 is aborted as soon as there are no longer any more good spare sectors left on the disk drive of the hypervolume, and a re-vector is restarted in step 106 with the hot spare disk drive specified as the destination. The list of bad sectors, however, should include bad sectors found whenever the source disk drive is read in step 105 or in 106.

In step 107, for each bad sector, an attempt is made to restore the data, and if the data cannot be restored, to abort any suspended application process relying on the data, and to restart any aborted process if appropriate. For example, it may be possible for server data lost from one copy in one RAID-5 set to be restored from another copy in another RAID-5 set. Metadata or data of a file system could be restored by restoring the missing metadata or data with a snapshot copy and then replaying a metadata or data transaction log against the snapshot copy. If a snapshot copy has been corrupted, it could be replaced with a backup copy that has been replicated to a remote data storage server. If a corrupted snapshot copy cannot be replaced, then it is deleted, and the snapshot copy process is restarted. If the record of transmitted blocks in the replication volume has been corrupted, then the replication process can be restarted to transmit all of the last snapshot changes. If the last snapshot changes are corrupted, the replication process need not be restarted if the record of blocks transmitted to and acknowledged by the remote data storage server indicates that the block that has been corrupted has already been received by the remote data storage server. Also in this case, the corrupted block can be restored by fetching the good copy from the remote data storage server. A specific example of organizing the data in storage to facilitate automatic restoration in this fashion is described below with reference to FIG. 7.

In step 108, the file systems that were unmounted because of bad sectors are tested for consistency of metadata and repaired if possible with the UNIX file system check utility (FSCK). If all damage to a network client's file system has been repaired, then the file system is remounted without a report of error to the client, and any suspended application waiting for access to the remounted file system is resumed.

In step 109 of FIG. 4, all re-vectored blocks of bad sectors are reverse-mapped to identify damaged or repaired data storage objects such as files, directories, and file systems. The damaged or repaired objects are reported to the system administrator with the status of damaged and repaired or not. It is possible that the reverse mapping may indicate that the damage to a block in a volume or file system is of no consequence because the block is not presently used for any directory or file of the file system. In step 110, if a network client's damaged object cannot be repaired, then the error is also reported to the client with an option to restore the object with any available snapshot copy or to remount the damaged file system, and to abort and resume any suspended client application waiting for the file system to be remounted. In step 111, the error event is removed from the server's panic log. Recovery from the bad sector media error is finished.

In practice, a four-phase transitional approach can be used to re-program a conventional network file server to automatically handle double sector errors. Prior to such re-programming, the conventional network file server, for example, responds to a double sector error by sending an error message to the system administrator, suspending further service for network clients (i.e., a system panic), and auto-dialing a service center to report the error to the service center.

In a first phase, the network file server is programmed so that after a system panic, the system administrator is permitted to re-vector a bad sector manually, identify impacted file systems and applications manually, make applications unavailable by unmounting the impacted file systems and inactivating snapshot copy and replication if impacted, run the FSCK utility upon the impacted file systems, and then restart service.

In a second phase, the network file server is programmed so that upon re-boot of the server, the server automatically re-vector a bad sector, and automatically identifies and reports the damaged objects to the system administrator. The system administrator may then attempt to repair or restore the damaged objects, and then restart service upon the repaired objects.

In a third phase, the network file server is programmed to automatically re-vector a bad sector, to report the damaged objects to the system administrator, and once the system administrator re-boots the network file server, to recover UxFS and the snapshot and replication applications in parallel. The automatic bad sector repair does not hold up processing of other applications once the system administrator re-boots the network file server. UxFS is recovered by running the FSCK utility upon the damaged file systems, and then mounting the repaired file systems. If the snapshot volume is damaged, then the snapshot copies are invalidated (unless it can be verified that the damaged block was not actually used in a snapshot). If a replication session was active and the damaged block was in the last snapshot changes being replicated or in the replication volume, then the replication session is terminated (unless it can be determined that the damaged block was already transferred to the remote storage server).

In the fourth phase, there is no system panic or need for a re-boot of the server in order to recover from a bad sector media error. Instead, the network file server is programmed to handle the media error as described above with reference to FIGS. 2, 3, and 4.

In the data processing system as described above with reference to FIG. 1, the cached disk array returns a bad sector media error message in response to a request from the data processor 26 for access to a sector of data storage specified by a logical block address. When the disk drives in the cached disk array are configured into RAID-5 sets, such an error message usually is the result of a double sector error in the RAID stripe including the specified sector. The error handling routine of FIGS. 2 to 4 has been described above as responding to damage of the specified sector and also looking for additional bad sectors that might reside in the disk drive including the specified sector. It should be understood, however, that there is most likely another bad sector in the stripe including the specified sector. Whether or not this other bad sector is likely to impact a data storage object depends on whether or not data storage objects are striped across the RAID-5 set, and whether or not the RAID-5 set is sparsely filled with data.

For small random access datasets such as text files, the files typically are not striped across the disk drives the RAID-5 set, and files typically become distributed throughout the disk drives of the RAID-5 set. Under these circumstances, a double sector error is likely to impact only one sector of one file. For other types of datasets, it may be likely that a double sector error would impact two sectors of a dataset or two of the datasets. This may occur for large files, or for file systems that have been compacted and put into a disk storage array for archival storage. This would also occur if a dataset is intentionally striped across the disk drives in the RAID set. For example, sequential datasets such as files of video data are often striped across a set of disk drives so that the data can be streamed from the disk drives at a high rate.

FIG. 5 shows a specific example of a mapping of file systems to four disk drives configured as a RAID-5 set. In this example, the disk storage of the RAID-5 set is sliced so that each of four file systems (FS_0, FS_1, FS 2, FS_3) in a respective slice is distributed across all of the disk drives. As shown, a double sector error has resulted from a bad parity sector (sector 1) and a bad data sector (sector 2) in the same stripe. The bad parity sector is in "DISK 1" and the bad data sector is in FS_1 in "DISK 2." It is also possible for a double sector error to result from two bad data sectors in the same stripe. In either case, the two bad sectors in the same stripe are in different physical disks. If a file system (e.g., FS_1) having a bad data sector is filled with data, it is likely that the bad data sector (e.g., bad sector 2) will impact a file or directory. In any case, if a physical disk is found to have a bad sector, there is a good possibility that the physical disk will have additional bad sectors. Therefore, when a bad sector is discovered, it is desirable to apply the procedure of FIG. 6.

Figure 6:
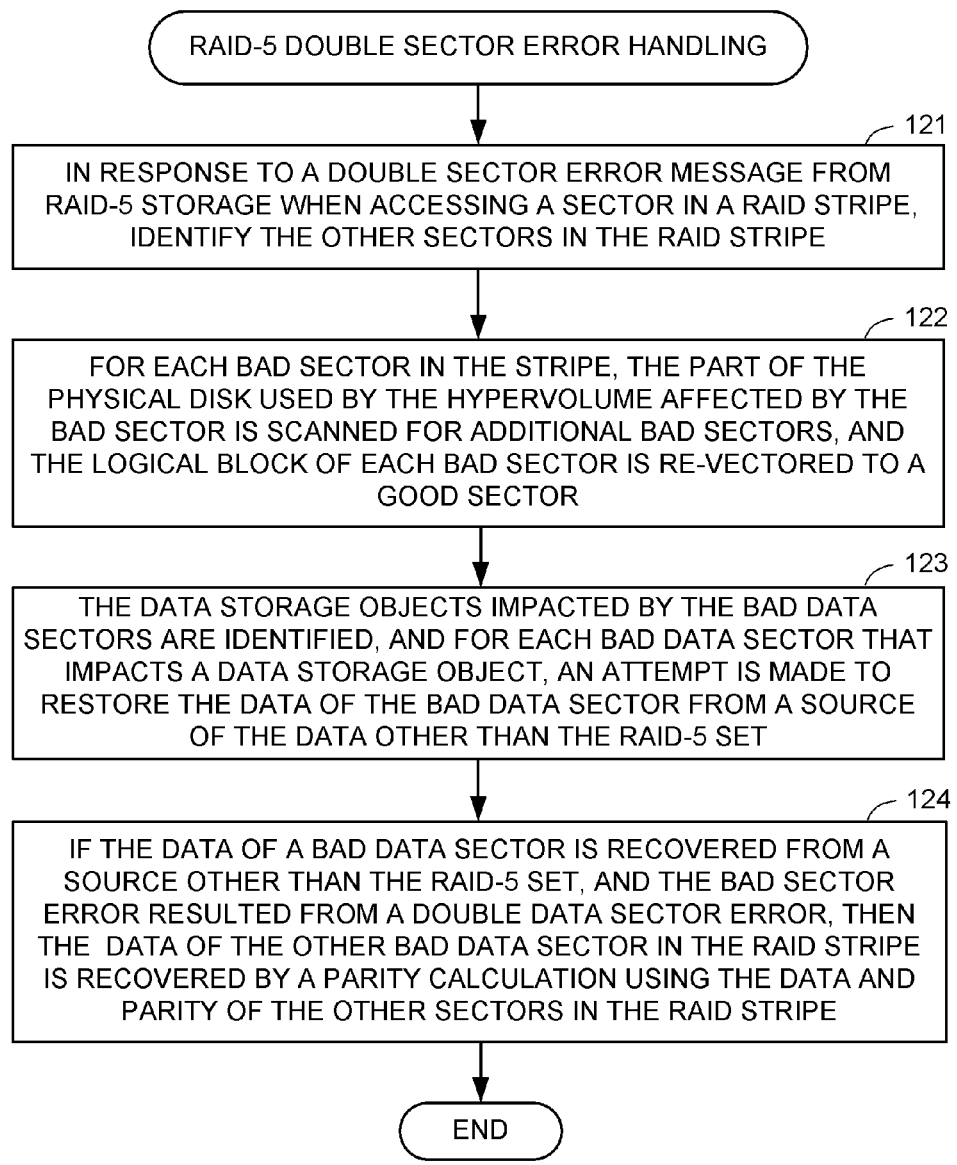
FIG. 6 shows a flowchart of a procedure for repairing damage caused by each of two bad sectors causing loss of data from the RAID-5 set of disk drives of FIG. 5.

In a first step 121 of FIG. 6, in response to a double sector error message from RAID-5 storage when accessing a sector in a RAID stripe, the other sectors in the RAID stripe are identified. In step 122, for each bad sector in the RAID stripe, the part of the physical disk used by the hypervolume affected by the bad sector is scanned for additional bad sectors, and the logical block of each bad sector is re-vectored to a good sector. In step 123, the data storage objects impacted by the bad data sectors are identified, and for each bad data sector that impacts a data storage object, an attempt is made to restore the data of the bad data sector from a source of data other than the RAID-5 set. Finally, in step 124, if the data of a bad data sector is recovered from a source other than the RAID-5 set, and the bad sector error resulted from a double data sector error, then the data of the other bad data sector in the RAID stripe is recovered by a parity calculation using the data and the parity of the other sectors in the RAID stripe.

FIG. 7 shows an arrangement of data structures in storage of two separate RAID-5 sets 61 and 62 of disk drives (in the cached disk array 27 of the network file server 23 of FIG. 1) to facilitate automatic restoration in the event that data is lost from one of the RAID-5 sets. These data structures are arranged in storage to provide various degrees of protection from loss or corruption of data.

The most critical data is data used by the server most of the time for multiple tasks. This server data is locally mirrored in the two RAID-5 sets so as to survive a double sector error in any one of the RAID-5 sets. Thus, there is a first copy 63 of a volume for server data in the first RAID-5 set 61, and a second identical copy 64 of the volume for server data in the second RAID-5 set 62. Each copy 63, 64 of the volume for server data includes server configuration data 65, 66 specifying the present hardware and software of the server; client/user attributes 67, 68 such as user IDs, passwords, access privileges, and storage quotas; and server state 69 including logs used for recovery from a server crash.

The next most critical data is file system metadata of client file systems. For example, the first RAID-5 set 61 contains a volume 71 for data of a first network client, and the second RAID-5 set 62 contains a volume for 73 for data of a second network client. The volume 71 for data of the first network client includes file system metadata 73 and file system data 74. The file system metadata 73 includes file system directories, attributes of files, and a mapping of the logical extent of each file to logical data storage blocks for storing the data of the file. The file system metadata 73 is protected by a metadata log 79 of changes made to the metadata. The metadata log 79 is sufficient restore a changed portion of the metadata to a consistent state. Together with a most recent snapshot copy of the file system, the metadata log 79 can also be sufficient to restore all of the file system metadata.

As shown in FIG. 7, the second RAID-5 set 62 includes transaction logs 77 for the first network client, and the first RAID-5 set 61 includes transaction logs 78 for the second network client. The transaction logs for each client include "after images" of changes being made to the production version of the client's file system since the most recent snapshot copy of the client's file system. The transaction logs 77 for the first network client include the metadata log 79 and an optional data log 80, and the transaction logs 78 for the second network client includes a metadata log 81 and an optional data log 82.

Together with the most recent snapshot copy of the file system, the data log 80, 82 can be sufficient to restore all data of the file system. For many client applications, however, a data log is not needed or desired because the data of the client's file system can be restored simply by re-running the application with or without a most recent snapshot copy of the client's file system. Thus, there is a trade-off between additional processing time and additional storage for producing the data log, and the processing time for restoring the client's file system by re-running the application with or without a most recent snapshot copy.

Snapshot copies may provide protection from data corruption in addition to data loss from a double sector error. If a series of snapshot copies of a file system have been retained, data corruption is detected, and it is found that the oldest snapshot copy is not infected with the data corruption, then processing of an application can be restarted upon the most recent snapshot copy known to be free from the data corruption.

As shown in FIG. 7, the second RAID-5 set 62 includes a snapshot volume 83 for the first network client, and the first RAID-5 set 61 includes a snapshot volume 84 for the second network client. The snapshot volume 83 of the first network client includes current "before images" 85 of blocks of the client's production file system 71 that have changed since the most recent snapshot copy, and last snap changes 86 since a base snapshot copy 90 of the client's production file system. In practice, the snapshot volume may include a series or queue of respective changes between successive snapshots, and the base snapshot copy may reside in a remote data storage server. The snapshot volume 84 of the second network client also includes current before images 88, and last snapshot changes 89 since a base snapshot copy 90.

For recovering from destruction of the entire network file server, the replication facility replicates the snapshot copies to a remote data storage server. The replication facility transmits, to the remote data storage server, copies of the last snapshot changes. The last snapshot changes are data blocks of the most recent snapshot copy that have changed since the snapshot just prior to the most recent snapshot copy. For recovery in case of a server crash, the network file server keeps in storage a record of the data blocks (of the last snapshot changes) that have been transmitted to the remote data storage server and acknowledged by the remote data storage server. The second RAID-5 set 62 includes a replication volume 91 for replicating data for the first network client. The replication volume 91 includes a record 93 of the data blocks (of the last snap changes 86) that have been transmitted to and acknowledged by the remote data storage server. The first RAID-5 set 61 includes a replication volume 92 for replicating data for the second network client. The replication volume 92 includes a record 94 of the data blocks (of the last snap changes 89) that have been transmitted to and acknowledged by the remote data storage server.

In view of the above, there has been described a method for recovery from a bad sector media error in a file server. File systems possibly impacted by the bad sector media error are unmounted. Then the disk drive having the bad sector is scanned in order to identify additional bad sectors, and for each identified bad sector, a logical address of the bad sector is re-vectored to a good sector. An attempt is made to restore the data of each bad sector, and then the file system is checked for consistency. If a bad sector cannot be restored, any application relying on the bad sector is aborted. Once the file system is found to be consistent, the file system is remounted. Re-vectored blocks are reverse mapped to identify damaged or repaired directories and files. Damaged or repaired directories and files are reported to a system administrator, and damaged directories or files of a client are reported to the client. In this fashion is it possible to provide automatic recovery from the bad sector media error without a re-boot of the file server and without a complete file system restore.

What is claimed is:

1. A method of responding to a bad sector media error of a disk drive in a file server, the disk drive having sectors storing logical blocks of a file system, said method comprising:
   (a) unmounting the file system; and then
   (b) scanning sectors of the disk drive in order to identify bad sectors; and for each identified bad sector, re-vectoring a logical address of the bad sector to a good sector; and then
   (c) checking the file system for consistency; and
   (d) once the file system is found to be consistent, remounting the file system;
   which further includes reverse mapping of logical block addresses of the bad sectors for identifying files damaged by the bad sectors, and reporting the damaged files to a system administrator.

2. A method of responding to a bad sector media error of a disk drive in a file server, the disk drive having sectors storing logical blocks of a file system, said method comprising:
   (a) unmounting the file system; and then
   (b) scanning sectors of the disk drive in order to identify bad sectors; and for each identified bad sector, re-vectoring a logical address of the bad sector to a good sector; and then
   (c) checking the file system for consistency; and
   (d) once the file system is found to be consistent, remounting the file system;
   which includes reverse mapping of logical block addresses of the bad sectors for identifying files of a client that are damaged by the bad sectors, and reporting the damaged files of the client to the client.

3. A method of responding to a bad sector media error of a disk drive in a file server, said method comprising:
   (a) reverse-mapping a logical block address of the bad sector of the bad sector media error to identify a damaged file containing a logical block of the bad sector; and
   (b) reporting to a client of the file server that the identified file is damaged.

4. The method as claimed in claim 3, which further includes searching for and finding an earlier version of the identified file, and when reporting to the client that the identified file is damaged, also reporting to the client that an earlier version of the identified file has been found, and asking the client whether the identified file should be restored with the earlier version of the identified file.

5. The method as claimed in claim 3, which further includes scanning sectors of the disk drive in order to identify additional bad sectors of the disk drive, reverse mapping logical block addresses of the additional bad sectors to identify additional files that are damaged by the additional bad sectors of the disk drive, and reporting the additional damaged files to the client of the file server.

6. The method as claimed in claim 5, which further includes identifying at least one application that relies upon data stored in at least one of the additional bad sectors, and in response aborting execution of said at least one application.

7. A file server comprising a disk storage array and at least one data processor coupled to the disk storage array for accessing a file system in the disk storage array in response to file access requests from clients of the file server, wherein said at least one data processor is programmed for responding to a bad sector media error of a disk drive in the disk storage array by:

(a) unmounting the file system; and then (b) scanning sectors of the disk drive in order to identify bad sectors; and for each identified bad sector, re-vectoring a logical address of the bad sector to a good sector; and then (c) checking the file system for consistency; and (d) once the file system is found to be consistent, remounting the file system;

wherein said at least one data processor is further programmed for reverse mapping of logical block addresses of the bad sectors for identifying files damaged by the bad sectors, and reporting the damaged files to a system administrator.

8. A file server comprising a disk storage array and at least one data processor coupled to the disk storage array for accessing a file system in the disk storage array in response to file access requests from clients of the file server, wherein said at least one data processor is programmed for responding to a bad sector media error of a disk drive in the disk storage array by:

(a) unmounting the file system; and then (b) scanning sectors of the disk drive in order to identify bad sectors; and for each identified bad sector, re-vectoring a logical address of the bad sector to a good sector; and then (c) checking the file system for consistency; and (d) once the file system is found to be consistent, remounting the file system;

wherein said at least one data processor is further programmed for reverse mapping of logical block addresses of the bad sectors for identifying files of a client that are damaged by the bad sectors, and reporting the damaged files of the client to the client.

* * * * *